5951X
J. Moore.
Cook Stove.
Patented May 7, 1830.
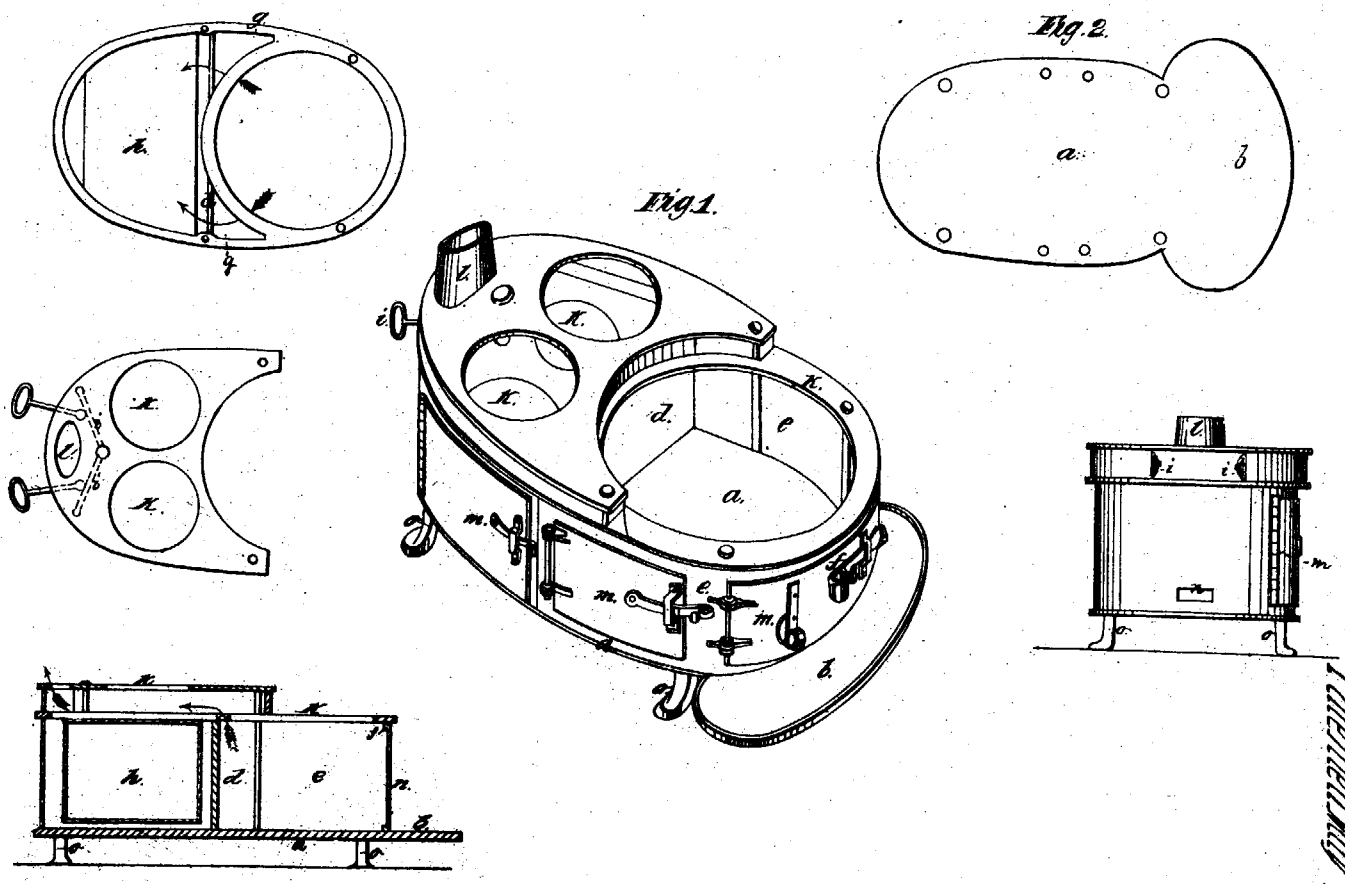

May 7. 1830   5951x   279

John Moore of Acworth State of New Hampshire.

Letters Patent.

The schedule referred to in these Letters Patent and making part of the same containing a description in the words of the said John Moore himself of his Improvement in the Cooking Stove.

Be it known, that I John Moore of Acworth, County of Sullivan and State of New Hampshire, have made an improvement in the Cooking Stove which is described as follows.

This Stove consists of the following principal parts Viz. 1. the bottom plate, 2 fire place, 3 The flues. 4 The oven, 5 openings for boilers &c. 6. doors 7. The Stand. 1. The bottom plate is of an oval shape made of cast iron, and suited to any required size; having a projection for the hearth. 2 the fire place, consists of four plates Viz. the back, the two sides and front having a proper opening for two doors, the whole is made of cast iron, and fastened together with rods and screws. This fire place is shaped and adapted to the bottom plate. 3. The flues. There are two flues of a triangular shape leading from the fire place under the two upper boilers and over the oven to the main funnel on the top of the Stove, 4. The oven is made of sheet iron and is situated behind the fire place, and occupies the hinder part of the Stove, having an opening passing down behind the fire place, below the oven and up behind the same, leading to the funnel on the top of the Stove, Upon the top and at the hinder part of the oven, are two dampers, hung like gates and having rods for opening and shutting them, and for throwing the fire under the oven, when required. The whole being enclosed by the sides of the Stove, which are made of sheet iron. 5. The openings for the boilers, over the fire place and in the top plate, is a circular opening of any required diameter to admit of kettles or pans for cooking over the oven and made higher than the one before mentioned is another top plate, having two circular openings to admit two boilers, the funnel and the rods on which the dampers are turned having side plates to enclose Drawing made 3d [illegible] 9. [illegible]

5951X the whole so as to form a chamber,

6. The Doors, there are two doors forming circular segments, to enclose the fire, having vents with valves to regulate the heat, — a side door leading into the oven, an ash door for removing the ashes which may collect behind, 7. The Stand; which supports the stove is made in the usual way, and is of cast iron,

What I claim as my invention and the use of which I wish to secure by Patent, are the two flues which admit the heat under the two upper boilers,

For a further illustration of my invention I refer to the model and drawing of the same, deposited in the patent office In testimony that the foregoing is a true specification of my invention I have made oath to the same and signed my name before two witnesses at the city of Washington, this 7th day of April 1830.

Witnesses Robt. W. Fenwick
Thomas H. Dawden

John Moore.

(630 [illegible])

Taken from a certified copy under Sign. John Forsyth Secty of State dated [illegible] 1836

[illegible]

Ch. [illegible]

Rec.d July 26. 1837 & Recorded [illegible]